United States Patent [19]

Hopper

[11] 4,278,076
[45] Jul. 14, 1981

[54] SOLAR COLLECTOR OF A LIQUID HEAT EXCHANGE TYPE

[75] Inventor: Thomas P. Hopper, Durham, Conn.

[73] Assignee: Sunworks, Inc., Guilford, Conn.

[21] Appl. No.: 101,693

[22] Filed: Dec. 10, 1979

Related U.S. Application Data

[63] Continuation of Ser. No. 883,393, Mar. 6, 1978, abandoned.

[51] Int. Cl.$^3$ ............................................. F24J 3/02
[52] U.S. Cl. .................................. 126/450; 126/442
[58] Field of Search ............... 126/450, 448, 442, 432; 138/108, 113, 111; 285/51-54, 66; 248/1, 56, 49

[56] References Cited

U.S. PATENT DOCUMENTS

| | | | |
|---|---|---|---|
| 941,150 | 11/1909 | Johnson | 285/252 |
| 1,800,578 | 4/1931 | Webb | 248/56 |
| 3,372,949 | 3/1968 | McLay | 285/364 |
| 3,559,730 | 2/1971 | Denjean | 248/56 |
| 3,916,871 | 11/1975 | Estes et al. | 126/450 X |
| 3,934,323 | 1/1976 | Ford et al. | 126/448 X |
| 4,067,317 | 1/1978 | Hubbard | 126/448 |
| 4,098,259 | 7/1978 | Barber, Jr. et al. | 126/450 X |

Primary Examiner—James C. Yeung
Assistant Examiner—Larry Jones
Attorney, Agent, or Firm—DeLio and Montgomery

[57] ABSTRACT

Arrangement for sealing an opening in a solar collector through which a header passes and for maintaining the integrity of the seal during movement of the header due to expansion and contraction thereof. A generally cylindrical resilient member compressively engages an adapter member defining the opening at a first annulus of contact and tapers to compressively engage the header at a second annulus of contact. In an alternate embodiment, the resilient member then flares to a third annulus of contact at the adapter. Apparatus is also disclosed for connecting and sealing the headers of adjacent collectors or a header to a manifold.

9 Claims, 5 Drawing Figures

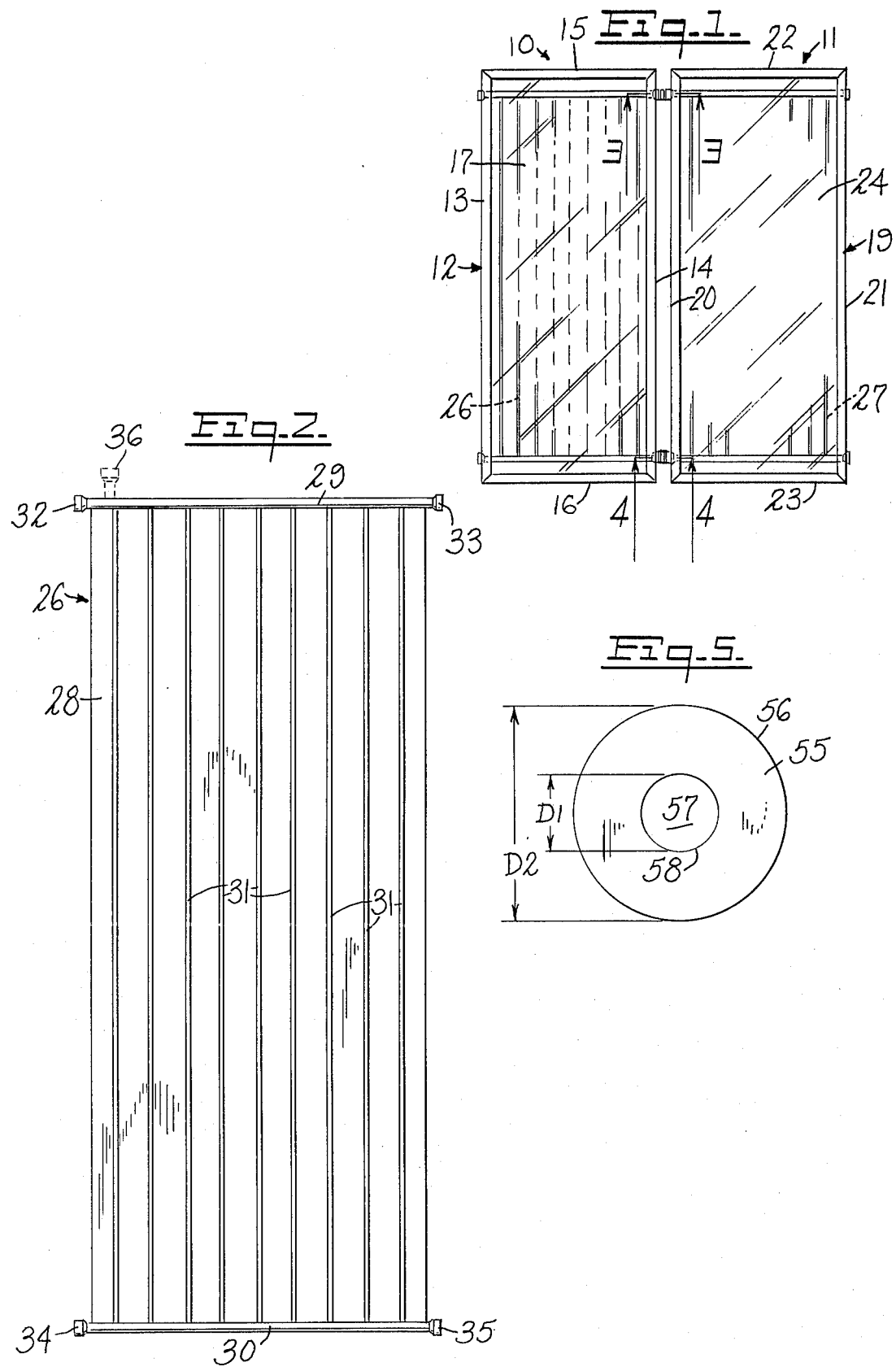

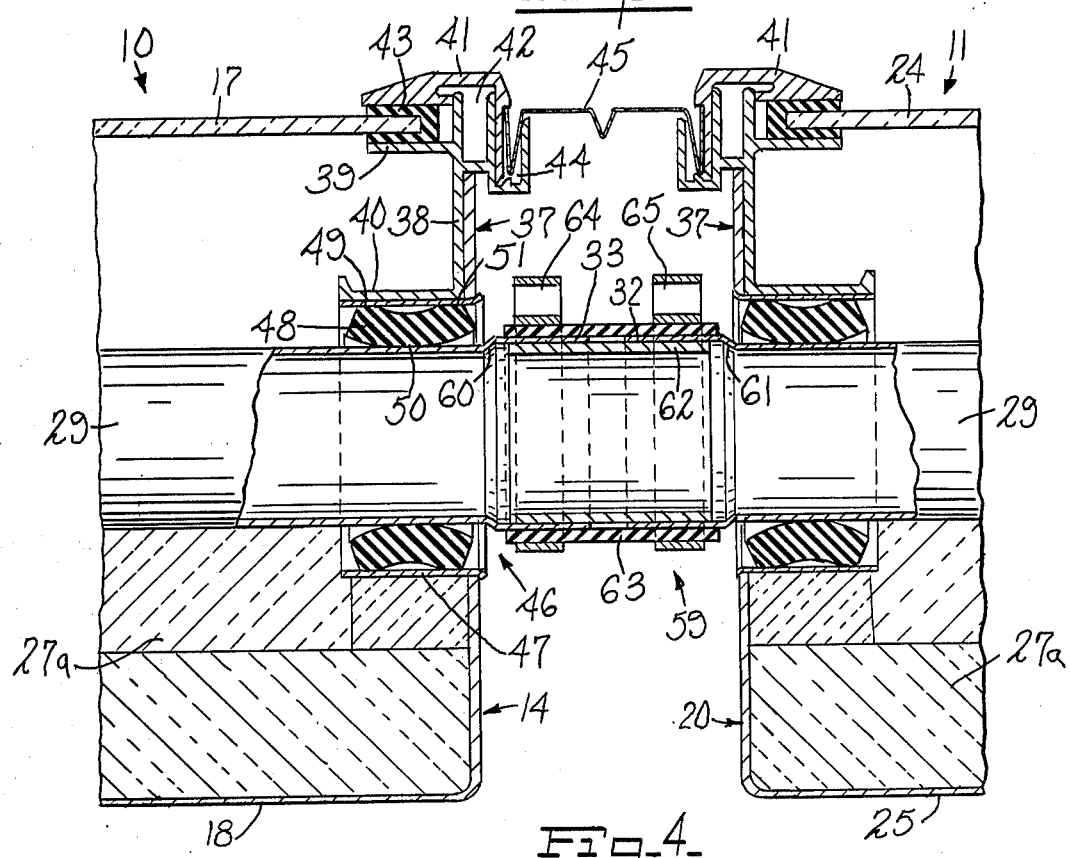

SOLAR COLLECTOR OF A LIQUID HEAT EXCHANGE TYPE

This is a continuation of application Ser. No. 883,393, filed Mar. 6, 1978, now abandoned.

This invention relates generally to solar energy heat collectors of the liquid-cooled type, and more particularly to sealing apparatus therefor.

Liquid-cooled solar heat collectors generally comprise a collector housing having an absorber assembly situated therein. Input and output headers are situated at opposing ends of the absorber. A plurality of heat exchange conduits extend between the headers in intimate heat exchange relationship with the absorber. Typically, a collector is part of a collector array. The headers of collectors in an array are connected to headers of adjacent collectors in the array, or to manifolds serving a plurality of collectors.

During the course of a day, the temperature of the collector, particularly of the absorber plate, conduits and headers, may vary from a temperature close to the ambient atmosphere at night, to several hundred degrees during the day. Such large temperature variations cause the absorber plate, headers and conduits to contract and expand. Such expansion and contraction cause variations in the distance between headers, the length of the headers and the diameter of the headers.

To minimize thermal losses in solar heat collectors, it is important that the absorber assembly be isolated from the collector housing, and also that the collector housing be sealed to prevent the entrance of cool ambient air through the openings where the headers exit the collector housing. Sealing means in the openings may be employed to accommodate expansion and contraction of the absorber assembly, and the associated movement of the headers with relation to the collector housing while maintaining the integrity of the seal between the housing and the header. Sealing means may also thermally insulate the header from the collector housing.

Accordingly, the present invention provides a new and improved means for sealing openings in solar heat collectors through which the headers exit to seal the inside of the collector from the ambient air. The sealing means also serves to prevent the headers from coming into direct thermal contact with the collector housing while permitting movement of the headers due to thermal expansion and contraction of the elements of the absorber assembly.

In one form of the invention, the sealing means comprises a generally cylindrical resilient member compressively contacting the opening defining means in the collector housing and tapering to compressively contact the header. In another form the resilient sealing means compressively engages the opening defining means at both ends thereof and compressively engages the header intermediate the ends.

An object of this invention is to provide new, improved and simplified means for sealing the openings in solar heat collectors through which the headers exit, which means maintain sealing engagement with movement of the header due to expansion and contraction.

The features of the invention which are believed to be novel are particularly pointed out and distinctly claimed in the concluding portion of this specification. The invention, however, both as to its organization and operation together with further objects and advantages thereof may best be appreciated by reference to the following detailed description taken in conjunction with the drawings, wherein:

FIG. 1 is a top plan view of two adjacent collectors;

FIG. 2 is an enlarged view of an absorber of one of the collectors of FIG. 1;

FIG. 3 is a view in section seen along the plane of lines 3—3 in FIG. 1;

FIG. 4 is a view seen along the plane of lines 4—4 of FIG. 1; and

FIG. 5 is a front view of one form of sealing means in a relaxed condition.

FIG. 1 shows two adjacent collectors 10 and 11. Collector 10 includes housing 12 comprising side walls 13 and 14, end walls 15 and 16, a transparent cover 17 and base 18 (FIGS. 3 and 4). Collector 11 includes housing 19 comprising side walls 20 and 21, end walls 22 and 23, a transparent cover 24 and base 25.

Collectors 10 and 11 further include respective absorbers 26 and 27 situated over and supported by insulation 27a. As exemplified in FIG. 2, absorber 26 includes an absorber plate 28 having headers 29 and 30 at opposing ends thereof. A plurality of heat exchange conduits 31 extend between headers 29 and 30 in intimate heat exchange relation with absorber plate 28.

Headers 29 and 30 terminate in longitudinally-extending ends 32, 33, and 34, 35, respectively. Alternatively, a fitting 36 (shown in broken lines extending from header 29 near end 32) may be provided extending laterally from the header if the header is to exit an end wall. Ends 32-35 may be swaged to an increased inner diameter.

As exemplified in FIGS. 3 and 4, the side and end walls of collectors 10 and 11 are formed in the shape of an open container whose upper edges support an upper rectangular frame 37 as disclosed in U.S. Patent Application Ser. No. 772,971, filed Feb. 28, 1977. The frame includes a vertical member 38, a support ledge 39 for supporting transparent top 17, and a condensation trough 40. A cap 41 received over a U-shaped channel 42 secures transparent cover 17 to ledge 39 through a resilient sealing member 43. A second channel 44 extends outwardly from channel 42 to receive flashing 45.

Header 29 extends through side wall 14 through a passage 46 defined by annular adapter member 47. A resilient annular sealing member 48 is provided to seal the opening between header 29 and adapter 47. Sealing member 48 tapers from one end 49 towards the center 50 and flares towards the other end 51 thereof. The sealing member is formed to provide two outer annuli of contact with the adapter member 47 at ends 49 and 51, and one inner annulus of contact with header 29 at the center 50. Sealing member 48 compressively engages the adapter member 47 and header 29 at the respective annuli of contact.

Annular sealing member 28 may be conveniently formed from a short length of flexible tubing having an appropriate diameter and wall thickness, turned inside out. An exemplary material is a moderately thick-walled extruded silicone tubing. Silicone is an effectively inert material capable of withstanding high temperatures. As an example, a suitable sealing member 48 for a one-inch nominal diameter header and an adapter having a 1.680" inside diameter can be formed from a three-fourths inch length of 50 durometer silicone tubing have 1.160" inside diameter and 0.240" thick wall, turned inside out.

The resilience of sealing members 48 will accept motion of the headers due to expansion and contraction of the absorber and also axial movement of the header. Sealing members 48 also act as a spacer between the headers and the collector housing, and further act to support the absorber assembly within the collector housing when the collector is disposed at an angle.

The sealing member may also be made in a predetermined molded form with enlarged ends (not shown); however, this form is more expensive than the form described above. Such a member may have a dumb-bell shape with the header extending through a passageway extending therethrough and with the enlarged ends compressively engaging member 47.

As exemplified in FIG. 4, a second embodiment of the invention comprises a resilient annular sealing member 52 having one outer annulus of contact with adapter member 47 at end 53 which tapers to an inner annulus of contact at end 54. Sealing member 52 compressively engages both adapter member 47 and header 30 at the respective annuli of contact.

Annular sealing member 52 may be formed from a resilient washer-like disk 55 of, for example silicone, as exemplified in FIG. 5. Member 52 has an outer edge 56 and a central aperture 57 defined by edge 58. Edge 56 provides an outer annulus of contact on adapter 47. Edge 58 provides an inner annulus of contact 54 on header 30. The diameter D1 of aperture 57 is chosen to be smaller than the diameter of header 30 and the outer diameter D2 of disk 55 is chosen to be larger than the diameter of adapter 47. When the disk is placed over header 30, edge 58 is stretched, enlarging aperture 57. The disk 55 assumes a configuration which tapers from edge 56 to edge 58. When the header 30 and disk 55 are inserted into adapter 47, disk 55 provides an effective seal about header 30. As an example, a suitable sealing member 52 for a header and adapter having dimensions as recited previously, may be formed from a disk 0.094" thick formed from a sheet of 50 durometer silicone, with an outer diameter D2 of two inches and an aperture D1 of five-eighths of an inch.

Sealing members 48 and 52 effectively insulate headers 29 and 30 from adapter 47 and also permit the position of headers 29 and 30 to vary in the opening defined by the adapter. As the headers 29 and 30 move, the portion of either sealing member, between the outer and inner annuli of contact, will deform to follow the movement, while the annuli of contact remain compressively engaged to the respective members. The closest that header 29 or 30 will get to adapter 47 is the thickness of the sealing member. The sealing and insulating integrity of members 48 and 52 is maintained regardless of the position of the header in the opening defined by adapter 47.

In another aspect, the invention provides a connection and seal 59 between headers of adjacent collectors. Ends 33 and 32 face each other spaced apart along the same axis. The ends have a slightly larger diameter than the respective headers. The transitions between diameters of the headers and respective ends provide stops 60 and 61. A nipple 62 slidably concentrically telescopes into ends 33 and 32. Stops 60 and 61 limit any axial movement of the nipple, preventing it from sliding into one of the headers. A resilient tubular sealing member 63 annularly envelopes ends 33 and 32 to provide a fluid-tight seal. Member 63 is clamped to ends 33 and 32 by clamps 64 and 65. Nipple 62 keeps ends 33 and 32 aligned.

When member 63 is clamped to ends 33 and 32, slack may be provided in member 63 between the clamps 64 and 65 to allow the headers to move without excessive tension on the member 63. In an alternative arrangement, as exemplified in FIG. 4, a resilient sealing member 66 may be provided having an accordian fold 67 to permit movement of the headers without stressing the seal. An exemplary material for members 63 and 66 is nylon fabric fiberglass reinforced silicone. The connection and seal 59 may also be used to connect a header to a manifold.

The form of collector shown in FIGS. 3 and 4 is by way of example only; the invention may conveniently be used with other forms of collectors.

The particular examples of materials and dimensions for sealing members 48 and 52 and tubular members 63 and 66 are also by way of example and not limitation. Other resilient materials may be used and the dimensions changed and adjusted according to the materials and diameters of headers and adapters.

It may thus be seen that the objects of the invention set forth as well as those made apparent from the foregoing description are efficiently obtained.

While preferred embodiments of the invention have been set forth for purposes of disclosure, modifications of the disclosed embodiments of the invention as well as other embodiments thereof may occur to those skilled in the art. Accordingly, the appended claims are intended to cover all embodiments of the invention which do not depart from the spirit and scope of the invention.

What is claimed is:

1. In a solar heat collector of the type comprising a housing with an absorber situated therein, said absorber having headers and heat exchange conduits therebetween, means defining a cylindrical passage having internal walls extending through an opening in said housing, said passage and said opening being of greater diameter than said header, a header extending through said passage and opening, and means for sealing the opening between said internal walls and said header comprising a resilient member having a first portion compressively engaging said internal walls, said member tapering to a second portion compressively engaging said header extending therethrough whereby said header may move laterally and longitudinally in said passage.

2. The collector of claim 1 where said sealing means is formed from a disk of resilient material having an aperture, said disk having an outside diameter larger than the inside diameter of the internal walls and said aperture having a diameter smaller than the outside diameter of the header extending therethrough.

3. The collector of claim 1 wherein said sealing means further flares to a third portion compressively engaging said internal wall, said second portion being intermediate said first portion and said third portion.

4. The collector of claim 3 wherein said sealing means is formed by turning inside out a length of moderately thick-walled resilient tubing.

5. In a solar heat collector of the type comprising a housing capable of being inclined at an angle, said housing having an absorber situated therein, said absorber having headers and heat exchange conduits therebetween, means defining a cylindrical passage having internal walls extending through an opening in said housing, said passage and said opening being of greater diameter than said header extending through said passage and opening, means for supporting said absorber in said housing when said housing is inclined and for sealing said opening comprising a resilient sleeve-like member having a passageway therethrough dimensioned to compressively engage one of said headers intermediate the ends thereof, and having ends of diameter larger than the diameter intermediate said ends, said member adapted to compressively engage said internal walls.

6. In a solar heat collector of the type comprising a housing with an absorber situated therein, said absorber having spaced apart headers and heat exchange conduits therebetween, said headers being subject to lateral movement and longitudinal expansion with changes in temperature, means forming an elongated cylindrical passage having an internal wall extending through an opening of said housing, said passage and said opening leading to an opening of greater diameter than said header, a header extending through said passage and opening, means for sealing the opening between said internal walls and said header comprising a resilient member having a first portion compressively engaging said internal walls and a second portion compressively engaging said header, said sealing means being formed from a disk of resilient material having a central aperture, said disk having an outside diameter larger than the inside diameter of said internal wall and said central aperture having a diameter smaller than the outside diameter of the header extending therethrough whereby said seal maintains contact with said header and said internal wall upon longitudinal and lateral movement of said header in said passage.

7. In a solar heat collector of the type comprising a housing with an absorber situated therein, said absorber having spaced apart headers and heat exchange conduits therebetween, means forming an elongated cylindrical passage having an internal wall extending through an opening in said housing, said passage and said opening being of greater diameter than said header, a header extending through said passage and opening, means for sealing the opening between said internal walls and said header while permitting said header to move laterally and longitudinally in said passage comprising a resilient member having a first portion compressively engaging said internal walls, said member tapering to a second portion compressively engaging said header, said member flaring to a third portion compressively engaging said internal wall, said second portion being intermediate said first portion and said third portion.

8. The collector of claim 7 wherein said sealing means is formed by turning inside out a length of moderately thick-walled resilient tubing.

9. In a solar heat collector of the type comprising a housing capable of being inclined at an angle, said housing having an absorber situated therein, said absorber having headers and heat exchange conduits therebetween, means defining an elongated cylindrical passage having internal walls extending through an opening in said housing, said passage and said opening being of greater diameter than said header, a header extending through said passage and opening, means for supporting the absorber in said housing when said housing is inclined and sealing the opening between said internal walls while permitting lateral and longitudinal movement of said header comprising a resilient member having a first portion compressively engaging said internal walls, said member tapering to a second portion compressively engaging said header, said member flaring to a third portion compressively engaging said internal walls, said second portion being intermediate said first portion and said third portion.

* * * * *